United States Patent [19]

Force et al.

[11] Patent Number: 4,774,703
[45] Date of Patent: Sep. 27, 1988

[54] SWITCHING SYSTEM FOR DIGITAL TRANSMISSION NETWORK

[75] Inventors: Claude J. Force, Brunoy; Claude C. Loisel, Montrouge, both of France

[73] Assignee: SAT, Paris, France

[21] Appl. No.: 802,674

[22] Filed: Nov. 29, 1985

[30] Foreign Application Priority Data

Nov. 30, 1984 [FR] France .................. 84 18265

[51] Int. Cl.$^4$ .......................... H04J 1/16; G06F 11/00
[52] U.S. Cl. .......................................... 370/16; 371/8; 379/16
[58] Field of Search ................... 370/16, 108; 179/175.35; 371/8, 68; 379/16, 17; 340/825.01

[56] References Cited

U.S. PATENT DOCUMENTS

| | | | |
|---|---|---|---|
| 4,234,956 | 11/1980 | Adderley | 375/38 |
| 4,365,247 | 12/1982 | Bargeton et al. | 340/825.01 |
| 4,429,386 | 1/1984 | Graden | 370/108 |
| 4,477,895 | 10/1984 | Casper | 370/16 |
| 4,514,844 | 4/1985 | Perry | 370/16 |

FOREIGN PATENT DOCUMENTS 2359553  2/1978  France .

Primary Examiner—Douglas W. Olms
Assistant Examiner—Frank M. Scutch, III
Attorney, Agent, or Firm—Stevens, Davis, Miller & Mosher

[57] ABSTRACT

A switching system is provided for application to a multichannel digital transmission network. It allows a defective channel to be replaced by an emergency channel without the user of the channel being aware of the replacement. On the emission side as well as on the reception side, switching and processing take place of bipolar signals, for example a High Density Bipolar 3 code, which allows the path doubled or extended so as to increase the operating safety of the network and provide greater flexibility in use.

12 Claims, 4 Drawing Sheets

SWITCHING SYSTEM FOR DIGITAL TRANSMISSION NETWORK

BACKGROUND OF THE INVENTION

1. Field of the Invention

The present invention relates to a switching system for a digital transmission network having at least one normal channel comprising, on the transmission side, means for applying, to the input of an emergency channel, the signal applied to the input of the normal channel and, on the reception side, means sensitive to the time shift between the signal of the normal channel and the signal of the emergency channel, adapted so as to control means for compensating said shift and for controlling means for switching from the normal channel to the emergency channel when said shift is compensated for.

Such a system is used for example in short wave link digital transmissions where, because of unfavorable propagation conditions or because of an equipment breakdown, a transmission channel has to be backed up. Taking into account the rate of appearance of this kind of difficulty and so that the cost of the system remains reasonable a single emergency channel is provided for several normal channels. It is therefore necessary to provide a switching system for replacing any normal channel by the emergency channel. In addition, it is preferable to effect such switching after making sure that these two channels have the same total propagation time so that the user does not notice the switching, which would be inevitably the case if such switching were effected without particular precautions.

2. Description of the Prior Art

Such systems are already known, described for example in patents U.S. Pat. Nos. 4,477,895 and 4,234,956. However, these systems are provided for operating with binary digital signals and cannot process bipolar digital signals, for example of the type coded according to the high density bipolar 3 code (HDB 3). Now this type of code is very well adapted to the transmission of the basic band digital signals over the great cable length met with in transmission and reception stations.

In fact a code HDBn corresponds to a signal at 3 levels, +1,0 and −1, which has no DC component and the code is provided so that more than n consecutive zeros are never met.

It is therefore interesting to have a switching system provided for operating with bipolar signals.

Such a switching system is already known, described in the application FR No. 2,359,553. This system comprises, on the emission side, means for applying to the input of an emergency channel a bipolar signal applied to the input of a normal channel and, on the reception side, means adapted for receiving bipolar signals and for controlling means, adapted for receiving bipolar signals, for switching from the normal channel to the emergency channel. However, no means sensitive to the time shift are provided nor means for compensating such a time shift. This system is therefore not provided for avoiding the discontinuities in the signal received by the user, which occur at the time of switching from the normal channel to the emergency channel when these two channels have different propagation times.

Another switching system is also known in which the input signal of said application means, on the transmission side, as well as the output signal from said switching means, on the reception side, are bipolar digital signals HDB3, and which is provided for switching without discontinuity in the case where the normal channel and the emergency channel have different propagation times.

In this system, said application means, on the transmission side, comprise a junction having an HDB3 input followed by a circuit for processing the HDB3 signal, comprising an amplifier with automatic gain control, a clock recovery circuit and a circuit for switching the positive and negative pulses. This processing circuit, or HDB3/binary+clock transcoder delivers on the one hand the clock signal and on the other two binary signals, i.e. at two levels 0 and 1, called respectively:

HDB+ signal (succession of the positive pulses of the HDB3),

HDB− signal (succession of the rectified negative pulses of the HDB3 signal).

The HDB3/binary+clock transcoder is followed by another processing circuit which transforms the two signals HDB+ and HDB− into a single binary signal which, accompanied by the clock signal, is processed by conventional logic circuits for generating the two binary output signals of the junction, one of which is applied to the input of the normal channel and the other of which may be applied to the input of the emergency channel if the normal channel must be replaced.

Similarly, the two binary signals received on the channel to be replaced and on the emergecy channel are applied to the binary inputs of the means sensitive to the time shift and of the means for compensating the time shift. Using conventional logic circuits, they are compared and delayed with respect to each other so as to compensate for their time shift. When this compensation is achieved, the binary signal of the emergency channel, by means of logic gates, is sent in the place of the binary signal of the channel to be replaced, through a transcoder which transforms it into an HDB3 code signal on an output cable.

Thus, in this known system, the junction has an HDB3 input and two binary outputs, whereas the reception means have two binary inputs and one HDB3 output.

That limits the use of the known system to binary data transmission networks.

In addition, since binary signals do not propagate well over large cable lengths, the junction must be placed very close to the transmitter and the switching circuit very close to the receiver.

But this results in two disadvantages.

On the one hand, the length of channel likely to be replaced by the emergency channel is reduced, as well as the number of elements which it includes and the risks of final breakdown in a channel are increased.

On the other hand, the junction and the switching circuit must be materially located on the towers of the short wave station, for example.

The present invention overcomes these disadvantages.

SUMMARY OF THE INVENTION

The invention provides then a switching system of the above mentioned type, in which said signal application means, on the transmission side, are adapted for transmitting bipolar signals and said sensitive means and said compensation means, on the reception side, are adapted for receiving these bipolar signals.

With the invention, and considering bipolar signals, all the switching means of the system of the invention, not only on the transmission side but also on the reception side may be moved away from the transmitter and the receiver respectively. This result is obtained in particular because the applicant had the idea of using and perfecting means, sensitive to the time shift, receiving bipolar signals.

In the preferred embodiment of the system of the invention, said signal application means on the transmission side, said sensitive means and said compensation means on the reception side each comprise, at each input, means for transforming a bipolar signal into two binary signals and a clock signal and said signal application means, on the transmission side, said compensation means and said switching means, on the reception side, each comprise, at each output, means for transforming said two binary signals and said clock signal into a bipolar signal.

Advantageously, said sensitive means, on the reception side, comprise logic means for adding the two binary signals of the normal channel, logic means for adding the two binary signals of the emergency channel, means for detecting the coincidence of the two addition signals, means sensitive to the phase shift between one of the two binary signals of the normal channel and each binary signal of the emergency channel, said coincidence detection means and said means sensitive to the phase shift controlling said switching means, on the reception side.

BRIEF DESCRIPTION OF THE DRAWINGS

The invention will be better understood from the following description of the preferred embodiment of the switching system of the invention, made with reference to the accompanying drawings in which.

DESCRIPTION OF THE PREFERRED EMBODIMENT

Figure 1:
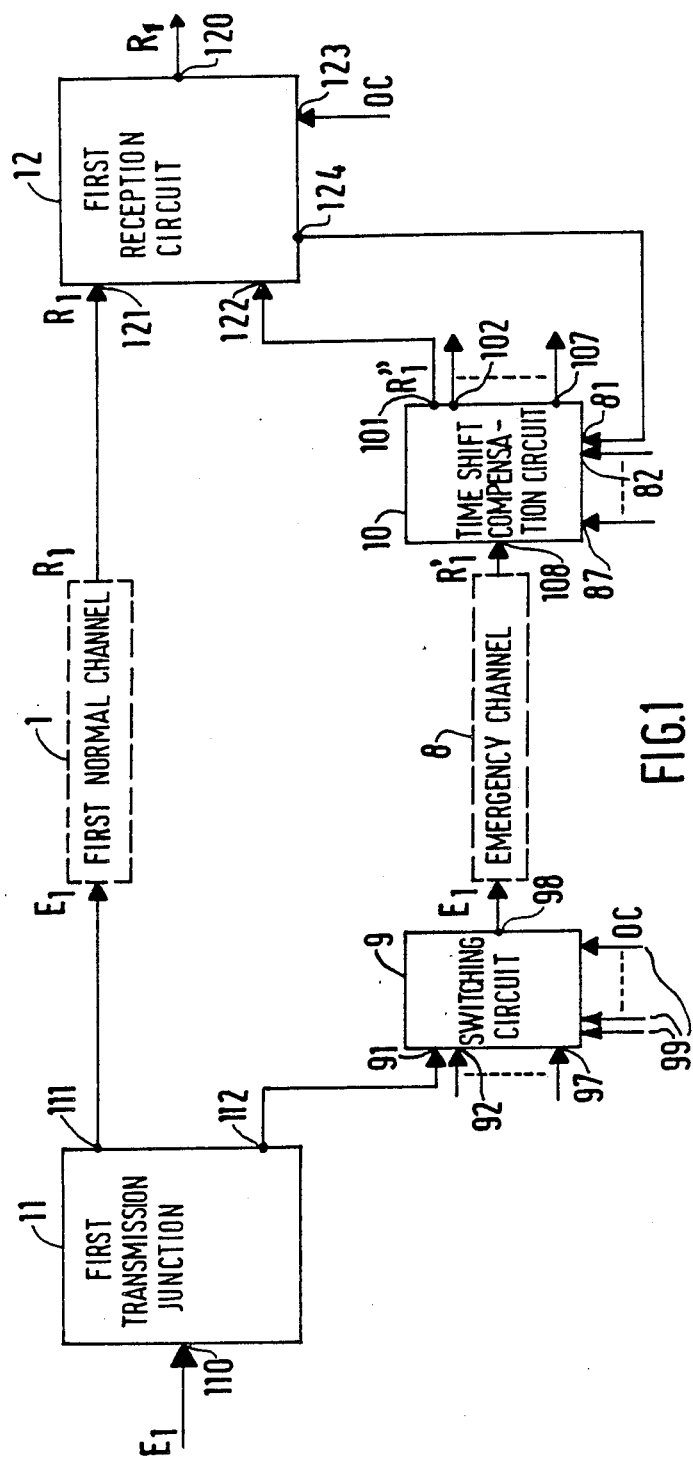
FIG. 1 shows a block diagram of the whole of the system.

In FIG. 1 is shown a first normal channel 1 of a network, here 7 normal digital transmission channels, the other six channels, identical in design to that of channel 1, not being shown for the sake of simplicity. The normal channel 1, receiving a transmission signal and transmitting a reception signal coded in the HDB3 code, may be replaced, like the other six normal channels, by a single emergency channel 8.

The system of the invention comprises, on the transmission side, seven transmission junctions, only the first transmission junction 11 of which has been shown, and a single switching circuit and, on the reception side, a single time shift compensation circuit 10 and seven reception circuits only the first reception circuit 12 of which has been shown.

The transmission junction 11 has one input accepting HDB3 coded bipolar signals, designated for the sake of simplicity by "HDB3 input" 110 and two HDB3 outputs 111 and 112. The HDB3 output 111 is connected to the input of the normal channel 1 and the HDB3 output 112 is connected to the first of seven HDB3 inputs 91 to 97 of the switching circuit 9 whose HDB3 output 98 is connected to the input of the emergency channel 8. The switching circuit 9 also has seven switching order inputs 99.

The output of the normal channel 1 is connected to an HDB3 input 121 of the reception circuit 12. The output from the emergency channel 8 is connected to an HDB3 input 108 of the time shift compensation circuit 10. The first of seven HDB3 outputs 101 to 107 of the time shift compensation circuit is connected to an HDB3 input 122 of the reception circuit 12. The reception circuit 12 also comprises an HDB3 output 120, a switching order input 123 and a shift control output 124, connected to the first of seven control inputs 81 to 87 of the time shift compensation circuit 10.

Before describing in greater detail each of the circuits 9, 10, 11 and 12, the operation of the assembly shown in FIG. 1 will be described.

The signal $E_1$, coded in the HDB3 code, to be transmitted over the normal channel 1, which signal may be possibly degraded by propagation over a long cable length, is applied to the HDB3 input 110 of junction 11, where it is shaped and recopied at the two HDB3 outputs 111 and 112. In normal operation, the signal $E_1$ is transmitted over the normal channel 1, and the corresponding signal received $R_1$ is applied to the HDB3 input 121 of the reception circuit 12, where it is reshaped and recopied at the HDB3 output 120.

When an anomaly is discovered, in a way known per se, in the signal $R_1$ downstream of the HDB3 output 120, a switching request is emitted which results in the production of the switching order for initializing the procedure for replacing the normal channel 1 by the emergency channel 8. The switching request device, of known type, as well as the general known members which produce the switching order has not been shown in FIG. 1 for the sake of simplicity.

In response to the switching order signal OC applied to the first input 99 of the switching circuit 9, the HDB3 input terminal 91 is connected to the HDB3 output terminal 98 and the signal $E_1$ is applied to the input of the emergency channel 8. The signal $R'_1$ received in the emergency channel 8, which may differ from the signal $R_1$ more especially by a time shift, due to the different propagation times from one channel to another, is applied to the HDB3 input 108 of the time shift compensation circuit, where it is reshaped and shifted in time to give a signal $R''_1$ recopied at the HDB3 outputs 101 to 107 of the time shift compensation circuit 10.

The signal $R''_1$ is then applied to the HDB3 input 122 of the reception circuit 12 where it is compared with the signal $R_1$ applied to the HDB3 input 121. If the signal $R_1$ is not in phase with the signal $R''_1$, the reception circuit emits, if a switching order is applied to its input 123, a shift control signal at the output 124 which commands from the time shift compensation circuit 10 a given incremental shift. This procedure begins again until the signals $R'_1$ and $R''_1$ are in phase, in which case the reception circuit 12 delivers to the HDB3 output 120 the signal $R''_1$ applied to the HDB3 input 122. The replacement of the normal channel 1 by the emergency channel 8 has taken place without the signal of the HDB3 output 120 undergoing any discontinuity, so without the user of channel 1 being aware of it. The normal channel 1 is free for allowing diagnosis and repair.

Figure 2:
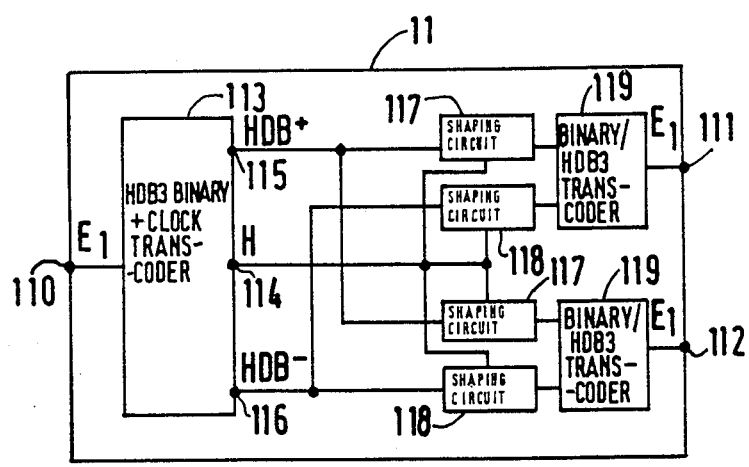
FIG. 2 shows a detail diagram of the transmission junction 11 of the system of FIG. 1.

Referring now to FIG. 2, the transmission junction 11 comprises a processing circuit 113 having an HDB3 input 110, a binary clock output 114, a binary output 115 called HDB+ output and a binary output 116 called HDB− output. The processing circuit 113, or HDB3/binary+clock transcoder, is identical to the one used in known systems, for example in the system described in French application No. 2 359 553 described above. The binary clock output 114 is connected to the clock inputs of four logic shaping circuits 117, 118. The binary HDB+ output 115 is connected to the two shaping circuits 117 and the binary HDB− output 116 is connected to the other two shaping circuits 118.

The two outputs of each pair of shaping circuits 117, 118 are connected to the two inputs of two output circuits 119, respectively. Each output circuit 119 is a binary/HDB3 transcoder of known type which delivers at the output an HDB3 signal from the two binary HDB+ and HDB− signals. The HDB3 outputs of the two output circuits 119 are connected to the HDB3 outputs 111 and 112 of the transmission junction 11.

The transmission junction 11 which has just been described operates in the following way. The bipolar HDB3 signal $E_1$ is applied to the input of the processing circuit 113, which delivers three binary signals, namely the clock signal H and the two HDB+ and HDB− signals. These latter two signals may be applied simultaneously to two independent chains, where they are reshaped by conventional logic circuits 117, 118 then recombined by the output circuits 119 into two HDB3 signals identical to $E_1$ at the HDB3 outputs 111 and 112.

Figure 3:
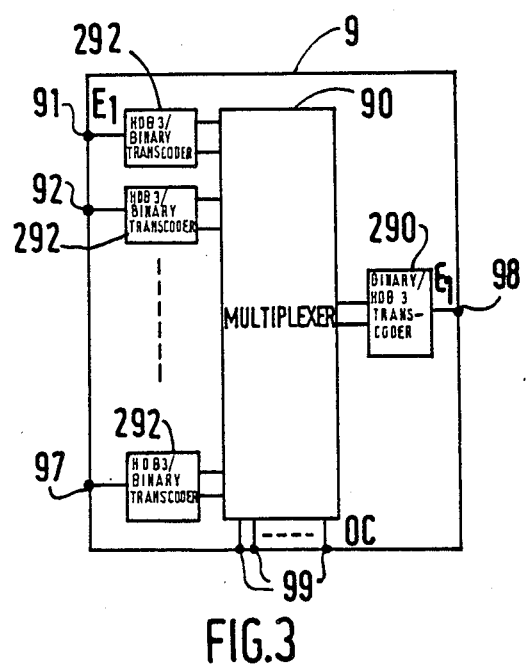
FIG. 3 shows a detail diagram of the switching circuit 9 of the system of FIG. 1.

Referring now to FIG. 3, the switching circuit 9 comprises, between the seven HDB3 inputs 91 to 97 and the HDB3 output 98, HDB3/binary transcoders 292 of known type, comparable to the HDB3/binary+clock transcoder 113 already met with, adapted for separating each HDB3 input signal into two signals HDB+ and HDB−, a multiplexer 90 of known type for selecting one of the seven pairs of HDB+ and HDB− signals, controlled by the switching orders OC applied to the inputs 99 and a binary/HDB3 transcoder 290 identical to the binary/HDB3 transcoder 119 for reforming an HDB3 signal from the selected HDB+ and HDB− signals.

The switching circuit 9, in response to a coded switching order OC, allows then any input 91 to 97 to be connected to the output 98.

Figure 4:
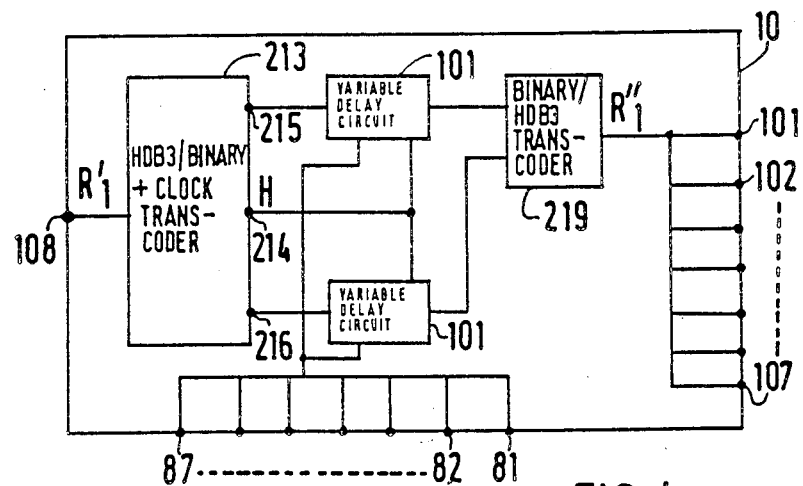
FIG. 4 shows a detailed diagram of the time shift compensation circuit 10 of the system of FIG. 1.

Referring now to FIG. 4, the time shift compensation circuit 10 comprises an HDB3/binary +clock transcoder 213 identical to that 113 of the transmission junction 11. The binary clock output 214 of transcoder 213 is connected to the clock inputs of two variable incremental delay circuits 101, of known type, the binary HDB+215 and HDB−216 outputs are connected to the signal inputs of two variable incremental delay circuits 101, respectively, whose binary outputs are connected to the inputs of a binary/HDB3 transcoder 219 of the type already met. The HDB3 output of transcoder 219 is connected to the seven outputs 101 to 107 of the time shift compensation circuit 10, whose seven control inputs 81 to 87 are connected together and connected to the inputs controlling the variation of the delay of each of the variable incremental delay circuits 101.

The time shift compensation circuit 10 operates in the following way. The HDB3 signal $R'_1$, applied to the input of transcoder 213, is transformed into a clock signal H and two signals HDB+ and HDB− which are delayed in an identical way by variable incremental delay circuits 101. The delayed signals HDB+ and HDB− are recombined by the transcoder 219 into an HDB3 signal $R''_1$ at the HDB3 outputs 101 to 107. The incremental delay introduced is controllable by the signal applied to one of the control inputs 81 to 87.

Figure 5:
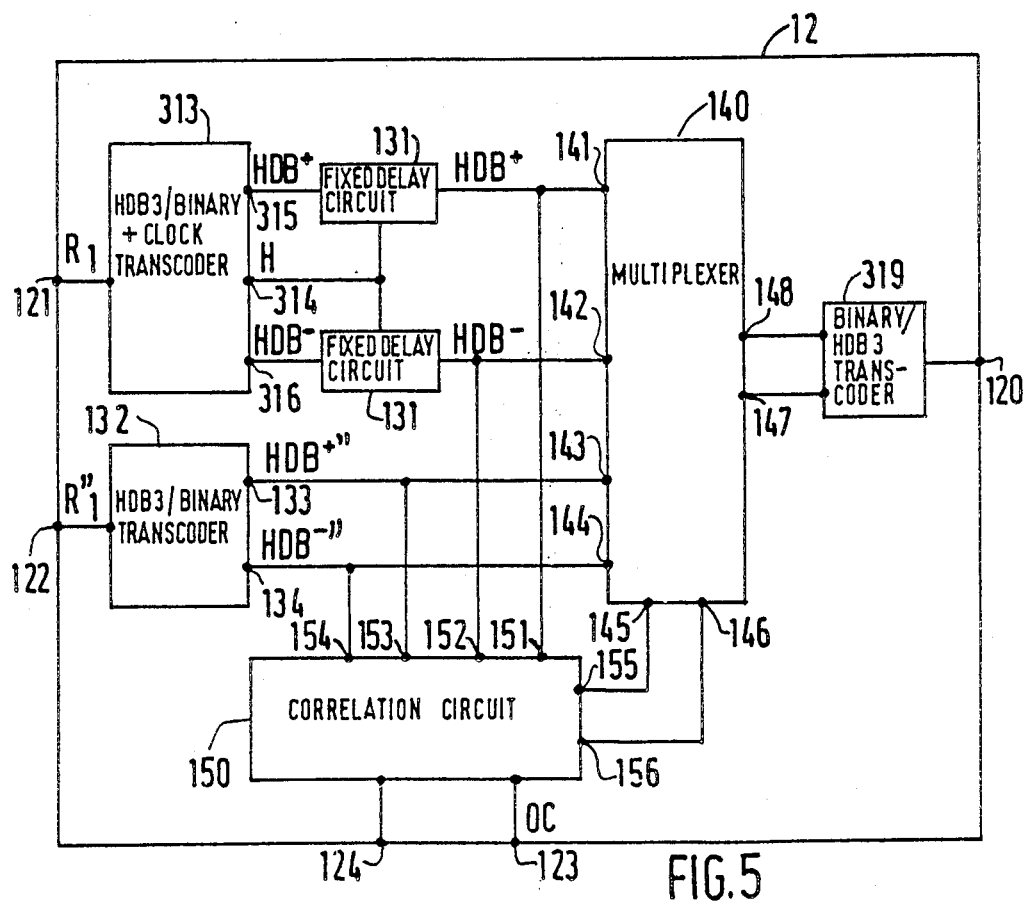
FIG. 5 shows a detail diagram of the reception circuit 12 of the system of the FIG. 1.

Referring now to FIG. 5, the HDB3 input 121 of the reception circuit 12 is connected to the input of an HDB3/binary+clock transcoder 313 of the type already met with in the transmission junction 11 and in the time shift compensation circuit 10. The binary clock output 314 of the transcoder 313 is connected to the clock inputs of two fixed incremental delay circuits 131 of known type. The binary HDB+ 315 and HDB− 316 outputs of transcoder 313 are connected to the respective signal inputs of each fixed logic delay circuit 131, whose outputs are connected to two binary inputs 141 and 142 of a multiplexer 140 having four binary inputs 141 to 144 and two binary outputs 147 and 148. The multiplexer 140 is controlled by two binary control inputs 145 and 146.

The HDB3 input 122 is connected to an HDB3/binary transcoder 132, identical to transcoder 292. The HDB+″ 133 and HDB−″ 134 outputs of transcoder 132 are connected to the pair of binary inputs 143-144. The pair of binary outputs 147-148 are connected to a binary/HDB3 transcoder 319 whose output is connected to the HDB3 output 120. The transcoder 319 is of the type already met with.

The binary inputs 141 to 144 of multiplexer 140 are connected respectively to four binary inputs 151 to 154 of a correlation circuit 150, having also a time shift control output connected to the output 124, two outputs 155 and 156 connected respectively to the control inputs 145 and 146 and a switching order input connected to the input 123.

The reception circuit 12 which has just been described operates as follows. The HDB3 signal $R_1$ applied to the input 121 of transcoder 113 is transformed into a clock signal and two signals HDB+ and HDB− which are delayed in an identical way by the fixed delay circuits 131, whose role is to compensate for too great a difference in the propagation time between the normal channel 1 and the emergency channel 8, which could not be corrected by the variable delay circuits 101. The output signals HDB+ and HDB−, suitably delayed, are applied to the multiplexer 140.

The HDB3 signal $R''_1$ applied to the input 122 of transcoder 132 is transformed into two signals HDB+″ and HDB−″ applied to the multiplexer 140.

The correlation circuit 150, which will be described further on, sensitive to the time shift between the signals HDB+, HDB−, HDB+″ and HDB−″ delivers, if a switching order signal OC is present at input 123, a shift signal at the output 124. When the correlation circuit 150 detects the absence of time shift between signals $R_1$ and $R''_1$ it delivers, still providing that the switching order signal OC is present at input 123, two control signals at the outputs 155 and 156, so that the multiplexer 140 suppresses the connections between the pair of inputs 141-142 and the pair of outputs 147-148 and forms the connections between the pair of inputs 143-144 and the pair of outputs 147-148 so that the signal from the HDB3 output 120 of the transcoder 319 undergoes no discontinuity.

Figure 6:
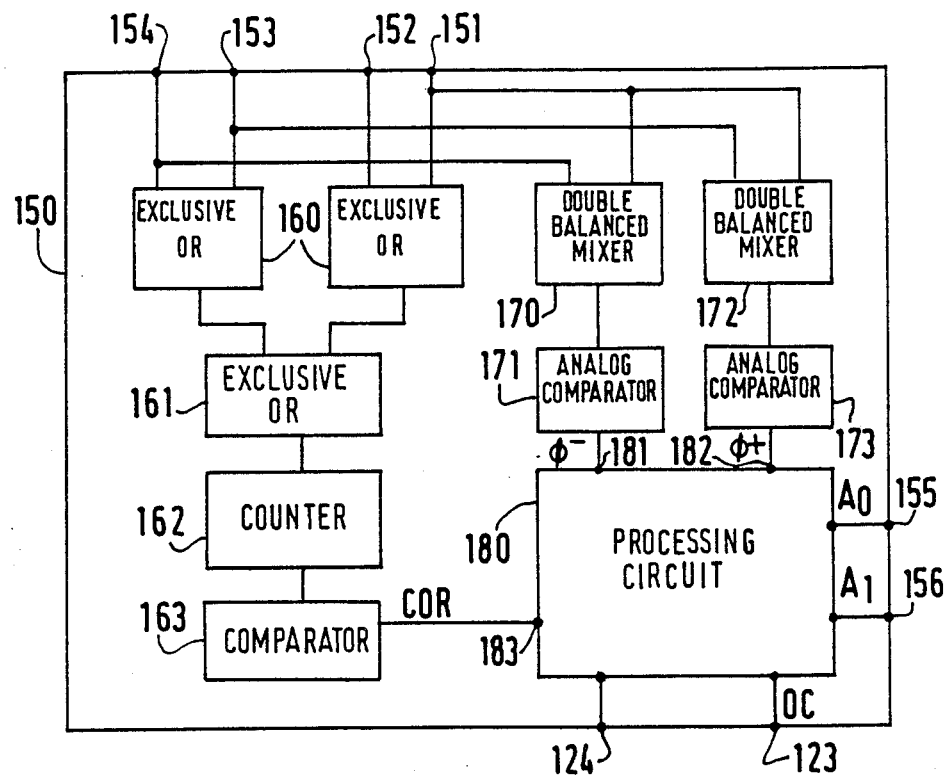
FIG. 6 a detail diagram of the correlation circuit 150 of the circuit of FIG. 5.

Referring now to FIG. 6, the binary inputs 151 and 152 on the one hand and the binary inputs 153 and 154 on the other of the correlation circuit 150 are connected respetively to the inputs of two exclusive OR circuits 160, whose outputs are connected to the inputs of a third exclusive OR circuit 161. The output of the exclusive OR circuit is connected to a counter 162 controlling a digital comparator 163. The output of the digital comparator is connected to an input 183 of a processing circuit 180.

The binary input 151 is connected to an input of a double balanced mixer 172, well known, whose other input is connected to the binary input 153. Similarly, the binary input 151 is connected to an input of another double balanced mixer 170 whose other input is connected to the binary input 154. The outputs of the double balanced mixers 170 and 172 are respectively connected to the inputs of analog comparators 171 and 173 whose outputs are connected respectively to two inputs 181 and 182 of the processing circuit 180.

The processing circuit 180 also has a switching order input connected to the input 123, a time shift control output connected to the output 124 and two switching control outputs connected to the outputs 155 and 156.

The operation of the correlation circuit will be understood if it is realized that one of the features of the HDB3 code is that two signals conveying the same information at the same time, such for example as signals $R_1$ and $R''_1$ when the time shift has been compensated for, may be either in phase (HDB+ and HDB+'' identical, as well as HDB− and HDB−'') or in phase opposition (HDB+ and HDB−'' identical as well as HDB− and HDB+''). This results from the fact that in this type of code the information is conveyed by the transitions and not by the absolute value of the signal. This is obviously the cause of considerable difficulties when it is desired, for switching HDB3 coded signals without losing information, to detect their time shift, which difficulties are solved in the system described here.

For this, at the output of each exclusive OR circuit 160 a signal is formed whose wave form is independent of a phase reversal of the HDB3 signal, which is the origin of the signals HDB+ and HDB− applied to the inputs of each exclusive OR circuit 160. When the two signals $R_1$ and $R''_1$ are without time shift, the output signals from the exclusive OR circuits 160 are identical and the output signal of the exclusive OR circuit 161 is always at a low level. The counter 162 counts no transition and the output signal COR of the digital comparator of circuit 162 is at the low level. On the contrary, if the time shift between $R_1$ and $R''_1$ is not zero, the counter will count numerous transitions and the signal COR will be at the high level; In this case, and if a switching order OC is present at input 123, the processing circuit delivers a shift signal at the output 124 and leaves the switching control signals $A_0$ and $A_1$ unchanged at the outputs 155 and 156 so that the output of the normal channel 1 remains applied to the output 120.

When the processing circuit 180 detects the annulment of the time shift through the signal COR passing to the low level, it delivers, still in the presence of the switching order OC at input 123, signals $A_0$ and $A_1$ causing the multiplexer 140 to apply the signals HDB+'' and HDB−'' of the pair of inputs 143-144 to the pair of outputs 147-148, so as to apply however HDB+'' at 148 and HDB−'' at 147, if $R_1$ and $R''_1$ are in phase, and the reverse if $R_1$ and $R''_1$ are in phase opposition. This is obtained through the outputs $\phi^+$ and $\phi^-$ of the analog comparators 171 and 173, respectively.

In effect $\phi^+$ is at the high level if $R_1$ and $R''_1$ are in phase, and $\phi^-$ is at the high level if $R_1$ and $R''_1$ are in phase opposition. The signals $\phi^+$ and $\phi^-$ applied to the processing circuit 180 causes the suitable switching by means of signals $A_0$ and $A_1$ to be ordered.

The processing circuit 180, formed from wired logic or from a microprocessor, is of a known type within the scope of a man skilled in the art. This circuit, in response to the above defined signals at its outputs 123, 181, 182 and 183, delivers output signals also defined above at its outputs 124, 155 and 156.

An additional advantage of the system which has just been described results from the fact that the time shift sensitive means process signals coded in the HDB3 code. It is a question of the fact that, even in the case where the information to be transmitted is a succession of 0s or a succession of 1s, the time shift may be detected, because the transitions are certain in the signal coded in HDB3 bipolar code, whatever the information to be transmitted. This is not the case in a conventional binary signal, for which the time shift is not detectable in the case of the transmission of a succession of 0s, or of 1s.

Of course, all that has been described in connection with the switching from the normal channel to an emergency channel, remains true when it concerns the switching from the emergency channel to the same normal channel.

The description which has just been made corresponds to a short wave link digital transmission network but the system of the invention may be used for different types of digital transmission networks, for example by means of cables, optical fibers and any type of network where the signals for access to the transmission channels are of the bipolar type.

What is claimed is:

1. In a switching system for a digital transmission network having at least one normal channel, comprising, on the transmission side, means for applying to the input of an emergency channel a signal applied to the input of the normal channel and, on the reception side, means sensitive to the time shift between the signal of the normal channel and the signal of the emergency channel adapted for controlling means for compensating said shift and means for switching from the normal channel to the emergency channel when said shift is compensated for, said signal application means on the transmission side are adapted for transmitting bipolar signals and further said sensitive means and said compensation means, on the reception side, are adapted for receiving bipolar signals.

2. The system as claimed in claim 1, wherein said application means, on the transmission side, and said sensitive means and said compensation means, on the reception side, comprise at each input means for transforming a bipolar signal into two binary signals and a clock signal and said signal application means, on the transmission side, and said compensation means and said switching means, on the reception side, comprise at each output means for transforming said two binary signals and said clock signal into a bipolar signal.

3. The system as claimed in claim 2, wherein said sensitive means, on the reception side, comprise means for the logic addition of the two binary signals of the normal channel, means for the logic addition of the two binary signals of the emergency channel, means for detecting the coincidence of the signals resulting from these logic additions, means sensitive to the phase shift between one of the two binary signals of the normal channel and each binary signal of the emergency channel, said coincidence detection means and said phase shift sensitive means controlling said switching means on the reception side.

4. The system as claimed in one of claims 1 to 3, further comprising several normal channels and a switching system, on the transmission side, and said time shift compensation means, on the reception side, are adapted so that any one of the normal channels may be replaced by the emergency channel.

5. Switching system for a digital transmission network having at least one normal channel and an emergency channel, between a transmission side and a reception side, comprising:
on the transmission side, at least one transmission junction, for applying to the input of said emergency channel a bipolar signal applied to the input of said normal channel;
on the reception side, means for compensating the time shift between the bipolar signal of said normal channel and the bioplar signal of said emergency channel; and
on the reception side, a reception circuit comprising means sensitive to said time shift and means for switching from the normal channel to the emergency channel, said time shift sensitive means being adapted for controlling said time shift compensation means until said time shift is compensated for, and then for controlling said switching means, said time shift sensitive means and said time shift compensation means being adapted for receiving bipolar signals.

6. The system as claimed in claim 5, wherein:
said transmission junction, said reception circuit, and said time shift compensation means, comprise at each input means for transforming a bipolar signal into two binary signals and a clock signal, and,
said transmission junction, said time shift compensation means and said switching means comprise at each output means for transforming said two binary signals and said clock signal into a bipolar signal.

7. The system as claimed in claim 6, wherein said time shift sensitive means having a first and a second input receiving the bipolar signals of said normal channel and of said emergency channel, respectively, and first and second transforming means, connected to said first and second input, respectively, said time shift sensitive means comprise:
first means for delivering a binary signal resulting of the logic addition of the two binary signals at the output of said first transforming means,
second means for delivery a binary signal resulting of the logic addition of the two binary signals at the output of said second transforming means,
means for detecting the coincidence of the two said binary signals delivered by said first and second means for logic addition,
first means sensitive to the phase shift between one of said two binary signals at the output of said first transforming means and one of said two binary signals at the outputs of said second transforming means;
second means sensitive to the phase shift between said one of the binary outputs of said first transforming means and the other of said two binary signals at the output of said second transforming means, and
processing means, connected to said coincidence detection means, and to said first and second phase shift sensitive means, for controlling said time shift compensation means and said switching means.

8. The system as claimed in one of claims 5 to 7, having several normal channels, and further comprising, on the transmission side, a switching circuit, said switching circuit and said time shift compensation means being adapted so that any one of the normal channels may be replaced by said emergency channel.

9. A switching system for a bipolar digital transmission network utilizing a transmission side and a reception side, each side having at least one normal channel and an emergency channel, said switching system comprising:
at least one transmission junction means, on said transmission side, for applying, in response to a switching order signal, a bipolar signal to the input of said normal channel and to the input of said emergency channel;
means, on the reception side and responsive to bipolar signals from said normal and emergency channels, for compensating, in response to said switching order signal, for any time shift between a bipolar signal received from said normal channel and a bipolar signal received from said emergency channel; and
a reception circuit, on the reception side, comprising means for switching from the normal channel to the emergency channel, and correlation circuit means for controlling said time shift compensating means until any time shift is compensated for.

10. The system as claimed in claim 9, wherein:
said transmission junction means, said reception circuit, and said time shift compensating means each include at least one input and each input includes transcoder means for transforming a bipolar signal into two binary signals and a clock signal; and
said transmission junction means, said time shift compensating means and said switching means each include at least one output and each output includes transcoder means for transforming said binary signals and said clock signal into a bipolar signal.

11. The system as claimed in claim 10, wherein said reception circuit includes a first input and a second input for receiving bipolar signals of said normal channel and of said emergency channel, respectively, and further including first and second transcoder means, connected to said first and second input, respectively, for providing a positive binary output and a negative binary output, said reception circuit further comprising:
first means for indicating the logical addition of the two binary outputs of said first transcoder means;
second means for indicating the logical addition of the two binary outputs of said second transcoder means;
means for detecting coincidence of the two indications delivered by said first and second indicating means;
first means for providing a signal indicative of any phase shift between one of said two binary outputs of said first transcoder means and one of said two binary outputs of said second transcoder means;
second means for providing a signal indicative of any phase shift between said one of the two binary outputs of said first transcoder means and the other of said two binary outputs of said second transcoder means; and processing means, connected to said coincidence detection means, and to said first and second phase shift signal indicating means, for controlling said time shift compensating means and said switching means.

12. The system as claimed in one of claims 9 to 11, having a plurality of normal channels, and further including, on the transmission side, a switching circuit means, responsive to said correlation circuit and said time shift compensating means, for replacing any one of said normal channels by said emergency channel.

* * * * *